March 1, 1949.  R. C. McMASTER  2,463,405
FUEL OIL PIPE FLOOR FITTING
Filed March 28, 1946

R. C. McMaster
INVENTOR.

BY
ATTORNEYS.

Patented Mar. 1, 1949

2,463,405

UNITED STATES PATENT OFFICE 2,463,405

FUEL OIL PIPE FLOOR FITTING

Raymond C. McMaster, Tenino, Wash.

Application March 28, 1946, Serial No. 657,798

1 Claim. (Cl. 285—205)

This invention relates to fuel oil pipe floor fittings, the primary object of the invention being to provide a one-piece fitting of this character, which may be manufactured at the minimum cost, and one which will be neat in appearance, and sanitary in operation.

Another object of the invention is to provide a fuel oil pipe floor fitting of a simple one-piece construction wherein all valves and valve seats are eliminated to the end that maintenance cost will be greatly reduced, over fuel oil pipe floor fittings now in common use.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing

Figure 1:
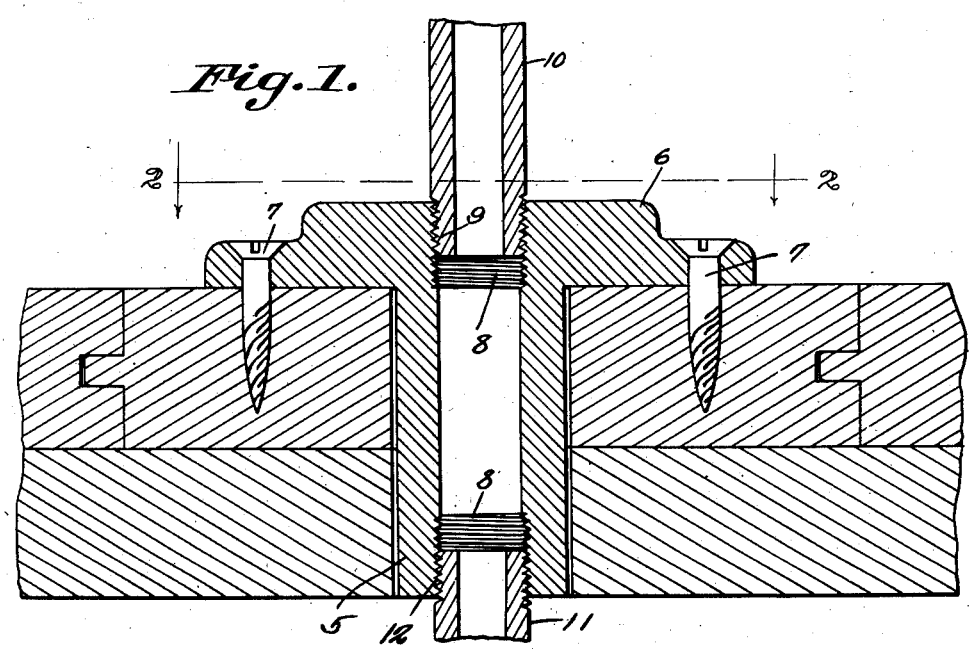
Figure 1 is a vertical sectional view through a fuel oil pipe floor fitting, constructed in accordance with the invention, and illustrating the fitting as positioned in an opening of the floor.
Figure 2:
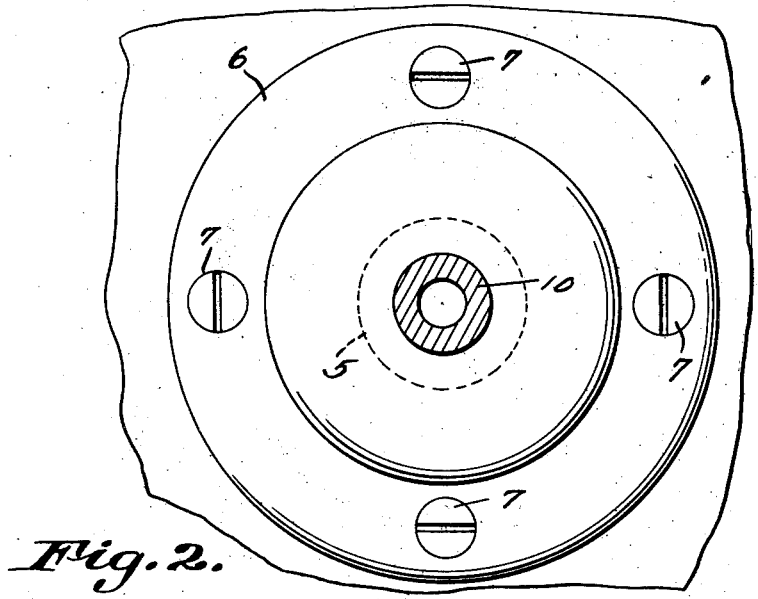
Figure 2 is a sectional view taken on line 2—2 of Fig. 1.

Referring to the drawing in detail, the fitting embodies a main tubular portion 5 which is of a length to extend through the floor in which the fitting is positioned, as clearly shown by Fig. 1 of the drawing.

At the upper end of the fitting is formed a wide annular flange 6 which is adapted to rest flush on the floor surface at the upper end of the opening in which the tubular body portion 5 is positioned. This flange 6 is formed with openings for the accommodation of the screws 7 by means of which the fitting is secured to the floor surface.

As clearly shown by Fig. 1 of the drawing, the tubular portion 5 is formed with internal threads 8 disposed at the ends thereof, the threads 8 at one end of the fitting being designed to receive the threaded end 9 of the fuel oil pipe 10 that leads from a suitable source of fuel oil supply, not shown.

The threads at the lower end of the fitting, accommodate the pipe 11 which is formed with a threaded end 12, the pipe 11 being the fuel supply pipe that supplies the fuel to the burner fed through the fitting.

From the foregoing it will be seen that due to the construction shown and described, I have provided a one-piece fitting which may be constructed at a minimum cost, and one wherein the fuel oil pipes may be securely fastened thereto, insuring against leakage between the pipes and fitting.

It will further be seen that the fitting which is formed with a raised central portion, is neat and sanitary, to meet the requirements of use.

What is claimed is:

A floor fitting for fuel oil pipes, comprising a body portion including a floor flange having openings, a tubular extension formed integral with the flange and adapted to extend through the floor, the lower end thereof being flush with the bottom surface of the floor, said floor flange having a central threaded bore forming a continuation of the tubular extension, and said tubular extension having internal threads at the lower end thereof, threaded pipes extending into the threaded bore and threaded extension, and screws extending through the openings of the floor flange, adapted to secure the floor fitting within an opening of the floor.

RAYMOND C. McMASTER.

REFERENCES CITED

The following references are of record in the file of this patent:

UNITED STATES PATENTS

| Number | Name | Date |
|---|---|---|
| 1,688,921 | Dows | Oct. 23, 1928 |